No. 748,532. PATENTED DEC. 29, 1903.
E. C. ROSENAW.
TEDDER.
APPLICATION FILED JUNE 11, 1903.
NO MODEL.
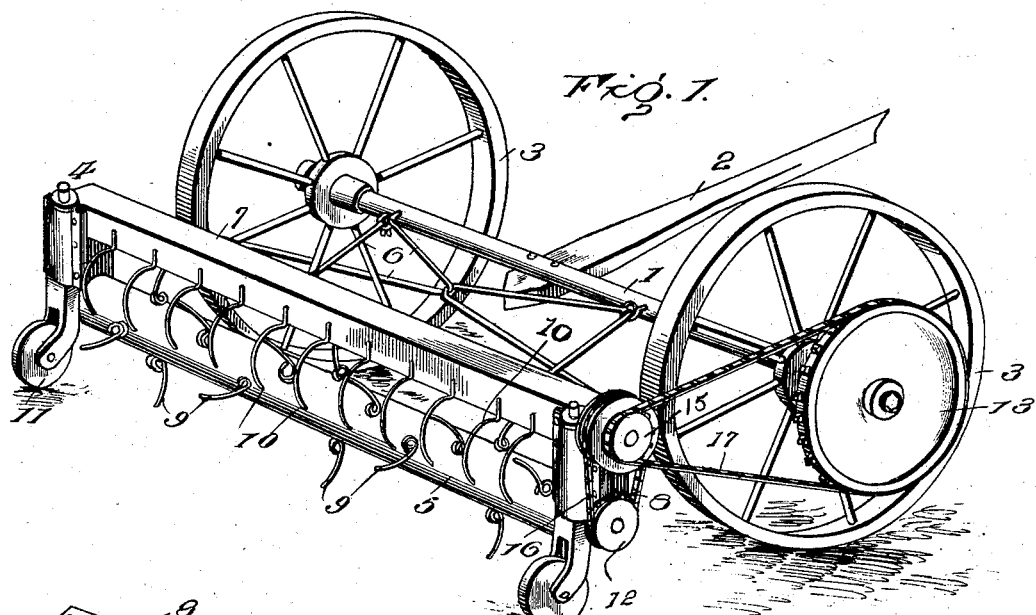
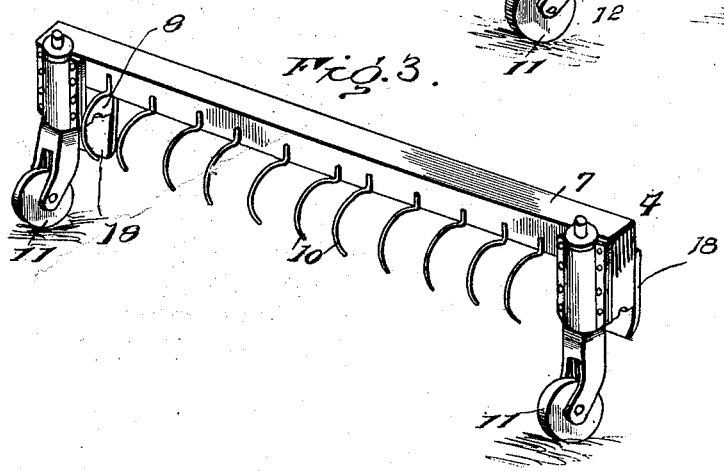
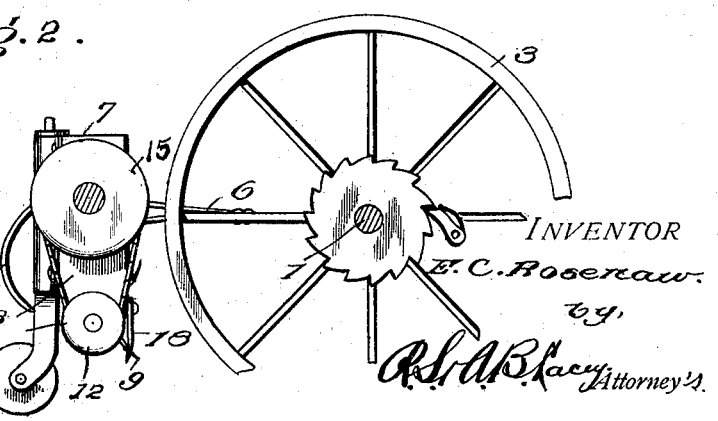
WITNESSES:
INVENTOR
E. C. Rosenaw.
Attorneys No. 748,532. Patented December 29, 1903.

UNITED STATES PATENT OFFICE.

EDWARD C. ROSENAW, OF FENNIMORE, WISCONSIN.

TEDDER.

SPECIFICATION forming part of Letters Patent No. 748,532, dated December 29, 1903.

Application filed June 11, 1903. Serial No. 161,100. (No model.)

*To all whom it may concern:*

Be it known that I, EDWARD C. ROSENAW, a citizen of the United States, residing at Fennimore, in the county of Grant and State of Wisconsin, have invented certain new and useful Improvements in Tedders, of which the following is a specification.

This invention provides new and novel improvements in tedders, the invention essentially consisting in the provision of a peculiar arrangement of spreader devices and construction thereof. The tedder is of such structure that the spreader devices are mounted so as to be readily operable as the implement is passed over uneven ground, the means for connecting the spreader devices to the actuator means being of special form, so as to allow the said spreader devices to adjust themselves to the inequalities of the ground aforedescribed.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the implement. Fig. 2 is a transverse sectional view outside the ground-wheel. Fig. 3 is a rear perspective view of the supporter-bar for the fixed cleaner devices.

Corresponding and like parts are referred to in the following description and indicated in all the views of the drawings by the same reference characters.

The tedder is designed to be arranged in the rear of the mowing-machine to be advanced over the ground therewith.

The implement consists of an axle 1, having a tongue 2 extended therefrom, whereby the device may be connected to the mowing-machine, or should it be desirable to operate the same separately from the mowing-machine proper draft means can be provided upon the tongue whereby horses or other draft-animals may be used for advancing the machine. Ground-wheels 3 upon the axle 1 are the means for communicating the motion to the reel 5, which is journaled to the rear supporting-frame 4. The supporting-frame 4 is connected to the axle 1 by longitudinally and diagonally disposed connecting-bars 6, the said bars being pivotally secured at their forward ends to the axle. The frame 4 consists of the supporter-bar 7, having the end bars 8 extended downwardly therefrom, between which the reel 5 is disposed and to which said reel is journaled in bearings provided thereon. The reel 5 is provided with spring-teeth 9, which coöperate with other teeth 10, which extend downwardly and rearwardly from the bar 7. The teeth 10 are rigidly secured to the said bar and coöperate with the spring-teeth 9, carried by the reel to clean the hay from the revolving teeth of the reel in a manner which will be readily apparent to those versed in this art. The frame 4 is supported by wheels 11, which are journaled to the rear side of the end bars 8. In order to transmit motion to the reel 5, a pulley 12 is provided upon one of the journaled ends thereof, and likewise a pulley 13 is provided upon an extension of one of the ground-wheels 3. An intermediate double pulley 15 is journaled in fixed bearings upon the adjacent end of the supporter-bar 7. Belts 16 and 17 connect the double pulley 15 with the draft-pulleys 12 and 13, respectively. To prevent operation of the reel 5 when the mowing-machine is moved rearwardly, the pulley 13 is provided with clutch mechanism, so as to be rotated as the mowing-machine advances only. Guards 18 are disposed upon the end bars 8 and extend laterally and downwardly from the said end bars to protect the bearings disposed thereon and prevent clogging of the hay between the reel and said bearings.

It will be noted that the frame 4 being pivoted to the axle 1 through the medium of the connecting-bars 6 will adapt itself readily to unevenness of the ground, which is of no small importance in this class of devices.

The tedder is of exceeding simplicity relative to the cost of construction, and the arrangement of parts is such as to secure the best possible results in spreading the hay.

Having thus described the invention, what is claimed as new is—

1. A tedder comprising an axle having ground-wheels thereon, a frame disposed in rear of the axle and comprising a supporter-bar and end bars, a reel journaled between the aforesaid end bars and provided with teeth, teeth extended rearwardly and downwardly from the supporting-bar for coöperation with the aforesaid teeth of the reel, wheels supporting the said frame, and belt connections between the reel and a ground-wheel for transmitting motion to the reel.

2. In a tedder in combination with an axle having ground-wheels thereon, a frame pivotally secured in rear of the axle and consisting of a longitudinal supporting-bar, end bars extended downwardly from the aforesaid supporting-bar, a reel journaled below the supporting-bar in fixed bearings upon the end bars, caster-wheels journaled to the end bars of the frame to support the same, spring-teeth extended from the reel, other spring-teeth rigidly secured to the supporting-bar and extending rearwardly and downwardly approximate with the teeth of the reel for coöperation therewith, and pulley connections between the ground-wheels and the reel for transmitting motion thereto.

3. In a tedder, the combination with an axle provided with ground-wheels, a frame disposed in rear of said axle, connecting-bars pivotally securing the said frame to the axle, the frame comprising a supporting-bar having downwardly-extending end bars, a reel disposed beneath the supporting-bar and journaled in fixed bearings upon the end bars, spring-teeth extended from the reel, other spring-teeth extending rearwardly and downwardly from the supporting-bar approximate the teeth of the reel for coöperation therewith, and guards disposed upon the front sides of the end bars and extending in front of the bearings in which the reel is journaled.

4. In a tedder, the combination with an axle provided with ground-wheels, a drive-pulley disposed adjacent one of the ground-wheels, clutch mechanism connecting the drive-pulley for actuation by the ground-wheel as the implement advances, a frame disposed in rear of the axle and pivotally connected thereto, said frame comprising a supporting-bar and downwardly-extended end bars, a reel disposed beneath the supporting-bar and journaled in fixed bearings upon the end bars, supporting-wheels journaled to the end bar for supporting the frame, a double pulley journaled to the supporting-bars a pulley journaled to one end of the reel, and belt connections between the pulley adjacent the ground-wheel and the pulleys aforesaid for transmitting motion to the reel, spring-teeth extended from the reel, and guards projected laterally and downwardly from the end bars extending in front of the bearings carried thereby.

In testimony whereof I affix my signature in presence of two witnesses.

EDWARD C. ROSENAW. [L. S.]

Witnesses:
C. C. WEBER,
C. W. MAUER.